United States Patent [19]
Yano

[11] Patent Number: 6,018,417
[45] Date of Patent: Jan. 25, 2000

[54] REAL IMAGE FINDER

[75] Inventor: Takaaki Yano, Hokkaido, Japan

[73] Assignee: Asahi Kogaku Kogyo Kabushiki Kaisha, Tokyo, Japan

[21] Appl. No.: 09/005,753

[22] Filed: Jan. 12, 1998

[30] Foreign Application Priority Data

Jan. 18, 1997 [JP] Japan .................................. 9-019886

[51] Int. Cl.[7] .......................... G02B 23/00; G03B 13/08
[52] U.S. Cl. .......................... 359/431; 359/362; 396/384; 396/386
[58] Field of Search .................................. 359/362–363, 359/420–422, 431–433, 676–677, 618, 629, 636–640, 831–837; 396/373–386

[56] References Cited

U.S. PATENT DOCUMENTS

| | | | |
|---|---|---|---|
| 3,656,421 | 4/1972 | Ataka | 396/384 |
| 3,788,202 | 1/1974 | Wiessner | 396/383 |
| 3,819,255 | 6/1974 | Matui | 359/836 |
| 4,565,433 | 1/1986 | Kato | 396/386 |
| 4,972,216 | 11/1990 | Ueda et al. | 396/383 |
| 5,034,764 | 7/1991 | Inabata | 396/384 |
| 5,130,855 | 7/1992 | Makai et al. | 359/836 |
| 5,537,184 | 7/1996 | Harsushita | 396/374 |
| 5,587,458 | 12/1996 | Itoh | 359/431 |

Primary Examiner—Thong Nguyen
Attorney, Agent, or Firm—Greenblum & Bernstein, P.L.C.

[57] ABSTRACT

A real image finder system is disclosed. The finder system includes a common objective optical system for forming a real image of an object. A first erecting optical system for erecting an object image formed by the objective optical system, a first eyepiece optical system for observing an image erected by the first erecting optical system, a branch plane which is constructed as one plane of a plurality of reflection surfaces included in the first erecting optical system, and guides a luminous flux from the objective optical system to proceed along a first optical path and/or along a second optical path different from the first optical path, a second erecting optical system which is arranged on the second optical path and erects an object image formed by the objective optical system, and a second eyepiece optical system for observing an image erected by the second erecting optical system.

5 Claims, 15 Drawing Sheets

REAL IMAGE FINDER

BACKGROUND OF THE INVENTION

The present invention relates to a real image finder which can erect a real image of an object, which is formed by an objective optical system, by means of an erecting optical system, and enables the erected image to be observed via an eyepiece optical system.

This type of real image finder having an objective lens system independent from a photography optical system has been conventionally employed as a finder of a small-size camera such as a lens shutter camera or the like. In general, the real image finder is constructed as an eye level finder for observing an object with a camera at an eye level height.

On the other hand, in the case of taking a photograph at a low angle, it is convenient to use a waist level finder which allows observation of an object from the top of the camera. For this reason, there has been conventionally proposed a hybrid type finder system which has two eyepiece optical systems, that is, eye level and waist level eyepiece optical systems with respect to a single common objective lens system.

Since the conventionally proposed hybrid type finder is constructed as a real image finder including an erecting optical system for the eye level optical system, an erected image can be observed through the eye level optical system. However, the hybrid type finder does not include an erecting optical system for the waist level system. For this reason, through the waist level optical system, the object image is observed in a state that the top and bottom or the right and left of image is inverted. Thus, there has arisen a problem that the hybrid type finder is not so easy to handle.

SUMMARY OF THE INVENTION

It is therefore an object of the invention to provide an improved real image finder system with which it is possible to observe an erect image in both eye level and waist level eyepiece optical systems in a hybrid type finder having the eye level and waist level eyepiece optical systems with respect to a common objective lens system.

For the above object, according to the invention, there is provided a real image finder system which is provided with two erecting optical systems and two eyepiece optical systems with respect to a common objective optical system. The erecting optical system includes a plurality of reflection surfaces, one of the plurality of reflection surfaces of one erecting optical system is used as a branch plane which guides a luminous flux incident from the objective optical system to either one of two eyepiece systems.

Specifically, the present invention provides a real image finder system which comprises: a common objective optical system for forming a real image of an object; a first erecting optical system for erecting an object image formed by the objective optical system; a first eyepiece optical system for observing an image erected by the first erecting optical system, a branch plane which is one of a plurality of reflection surfaces included in the first erecting optical system guiding a luminous flux from the objective optical system to either one of a first optical path extending to the first eyepiece optical system and to a second optical path which is different from the first optical path; a second erecting optical system which is arranged on the second optical path and erects an object image formed by the objective optical system; and a second eyepiece optical system for observing an image erected by the second erecting optical system.

The aforesaid first and second eyepiece optical systems correspond to an eye level and waist level eyepiece optical systems, respectively. With the above construction, an erect image can be observed by either one of the eye level or the waist level eyepiece optical system. Further, a reflection surface of one erecting optical system is used as the branch plane, and with such a structure, a space for accommodating the erecting optical systems can be made smaller as compared with the case where respective erecting optical systems are arranged after an optical path branches.

DETAILED DESCRIPTION OF THE PREFERRED EMBODIMENTS

Four preferred embodiments of a real image finder according to the present invention will be described below in detail.

Figure 1:
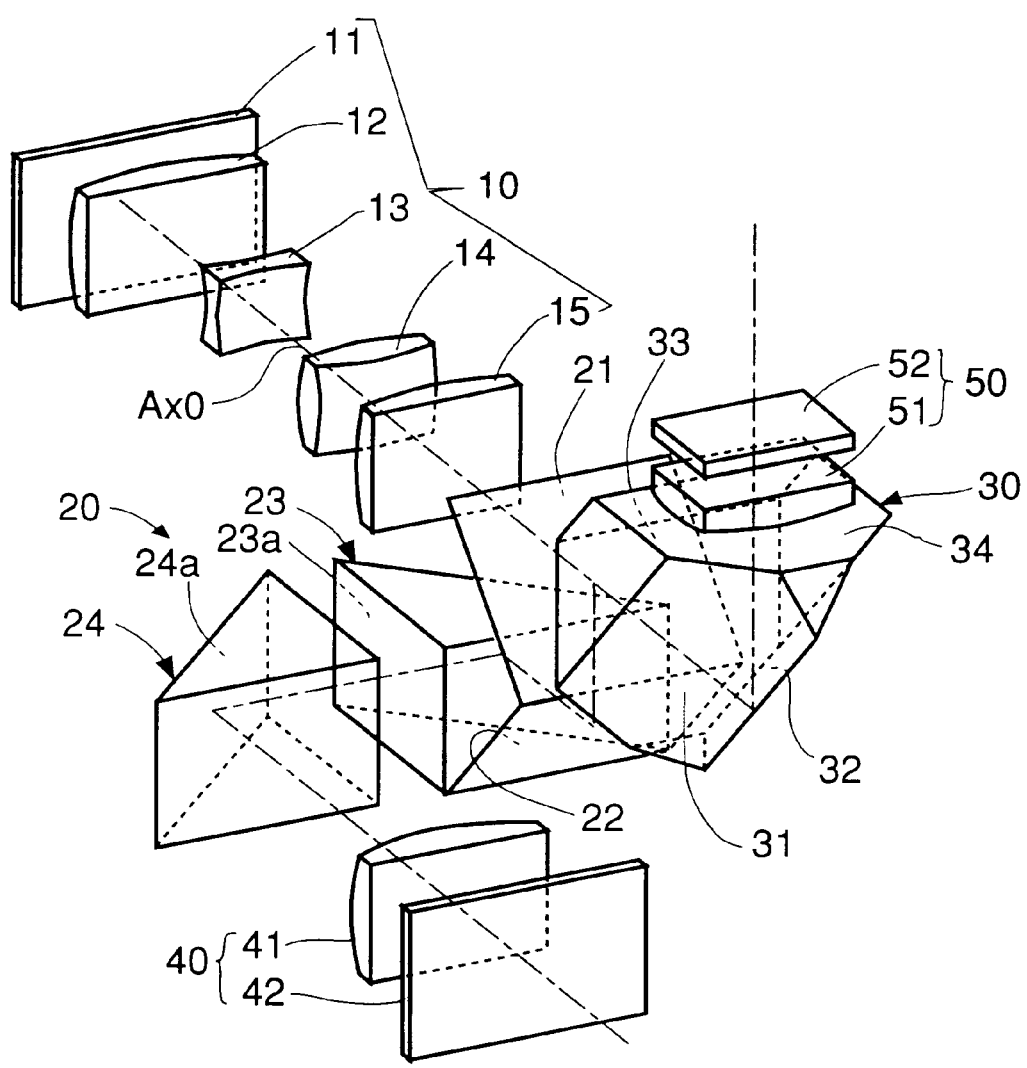
FIG. 1 is a perspective view showing an arrangement of an optical system of a real image finder according to a first embodiment of the present invention.
Figure 2:
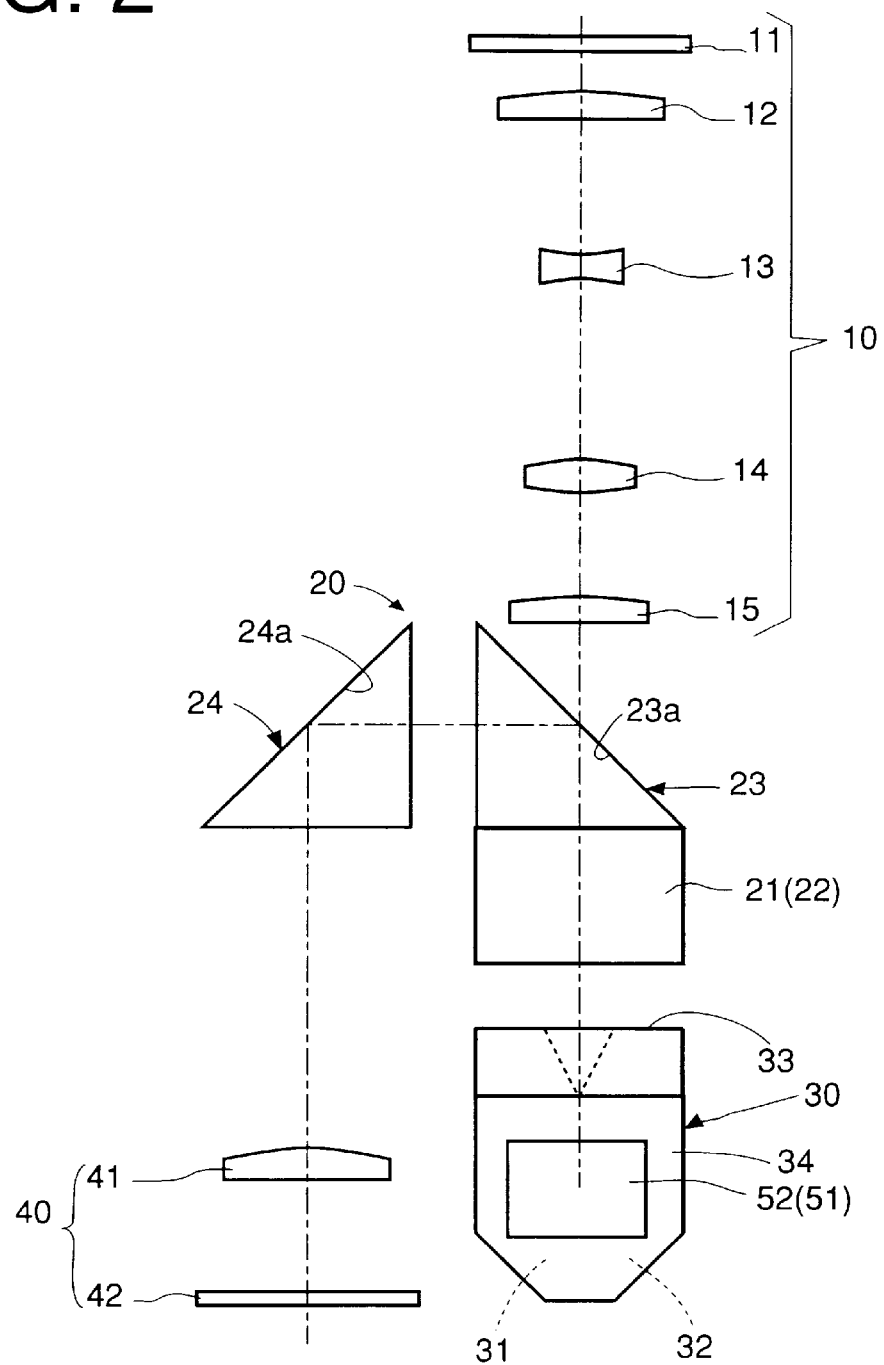
FIG. 2 is a top plan view of the optical system shown in FIG. 1.
Figure 3:
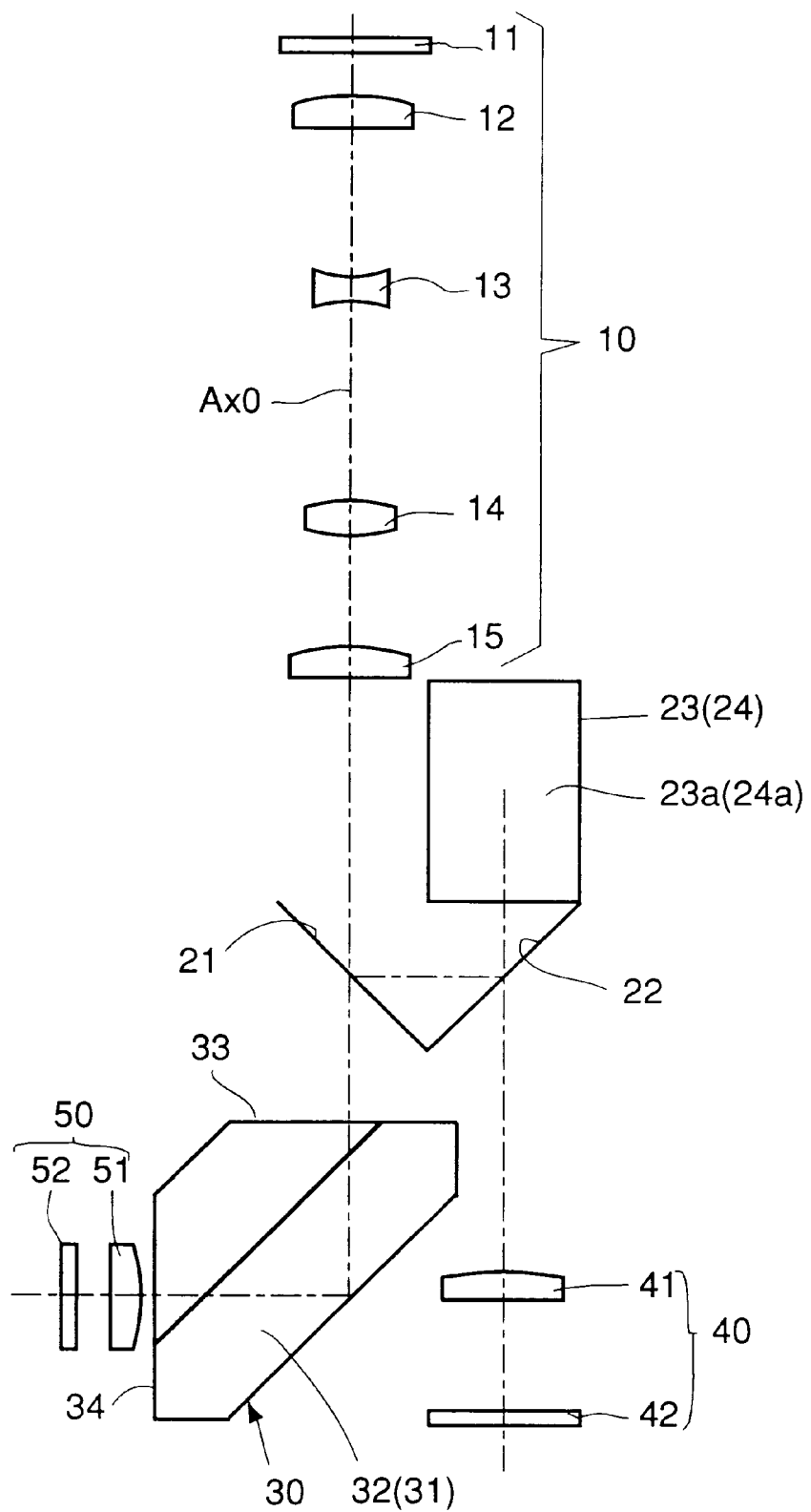
FIG. 3 is a side view of the optical system shown in FIG. 1.

FIGS. 1 to 3 show an arrangement of an optical system of a real image finder according to a first embodiment. FIG. 1 is a perspective view showing an optical system, FIG. 2 is a top plan view of the optical system shown in FIG. 1, and FIG. 3 is a right side view of the optical system shown in FIG. 1. This real image finder comprises a common objective optical system 10 which forms a real image of an object, an eye level erecting optical system 20 which is a first erecting optical system for erecting an object image formed by the objective optical system 10, an eye level eyepiece optical system 40 which is a first eyepiece optical system for observing an image erected by the eye level erecting optical system 20, a waist level erecting optical system 30 which is a second erecting optical system for erecting the object image formed by the objective optical system 10, and a waist level eyepiece optical system 50 which is a second eyepiece optical system for observing the image erected by the waist level erecting optical system 30.

The objective optical system 10 is composed of a cover glass 11, and four lenses, that is, a planoconvex lens 12, a double-concave lens 13, a double-convex lens 14 and a planoconvex lens 15, in the named order from an object side. Further, the objective optical system 10 is an imaging optical system which has, as a whole, a positive power. The eye level and waist level eyepiece optical systems 40 and 50 is composed of planoconvex lenses 41 and 51 and cover glasses 42 and 52, respectively.

The eye level erecting optical system 20 is composed of first and second mirrors 21 and 22 and first and second right-angle prisms 23 and 24, and has four reflection surfaces equivalent to reflection surfaces of a Porro prism of type one. It should be noted that the Porro prism (either type one or type two) is well know and description thereof will be omitted. The Porro prism is illustrated, for example, in *Modern Optical Engineering,* McGraw-Hill, Inc. (1996). These four reflection surfaces make two sets of reflection surfaces which meet each other at right angles (90°), and are arranged so that intersecting lines of reflection surfaces of respective sets are perpendicular to each other. In this embodiment, the first and second mirrors 21 and 22 make a set of reflection surfaces so as to meet each other at right angles (90°). Further, reflection surfaces 23a and 24a of the first and second right-angle prisms 23 and 24 make an another set of reflection surfaces which meet each other at right angles (90°) The intersecting line (ridge line) formed by the first and second mirrors 21 and 22 and the intersecting line (imaginary line at which the two reflection surfaces intersect) of the reflection surfaces 23a and 24a are perpendicular to each other.

Of four reflection surfaces constituting the eye level erecting optical system 20, the first mirror 21 which is nearest to the object side is constructed as a branch plane. The first mirror 21 which functions as the branch plane is constructed as a half mirror which reflects part of luminous flux incident from the objective optical system 10 and transmits part of the same. The luminous flux reflected by the first mirror 21 travels along a first optical path directing towards the eye level eyepiece optical system 40; on the other hand, the luminous flux transmitted therethrough travels along a second optical path directing towards the waist level eyepiece optical system 50.

The waist level erecting optical system 30 is constructed as a Dach (roof) prism which is arranged on a position where the luminous flux transmitted through the first mirror 21 is incident. The Dach prism 30 is a prism having Dach type reflection surfaces 31 and 32 which are arranged to form right angles, and is arranged so that the ridge line of these reflection surfaces intersects an optical axis Ax0 of the objective optical system 10 at an angle of $45°$. According to such an arrangement of reflection surfaces, the top and bottom and the right and left of the incident luminous flux are inverted, and the luminous flux is deflected in its direction at an angle of 90° to be emitted. An incident side end surface 33 of the Dach prism 30 is perpendicular to the optical axis Ax0 of the objective optical system 10; on the other hand, an emission side end surface 34 thereof is perpendicular to an optical axis vertically deflected by the Dach type reflection surfaces 31 and 32.

In accordance with the aforesaid first embodiment, the luminous flux incident through the objective optical system 10 forms a spatial image (inverted image) of the object before the first mirror 21, and branches into two optical paths by the first mirror 21. The luminous flux reflected by the first mirror 21 is reflected by the other three reflection surfaces 22, 23a and 24a of the eye level erecting optical system 20 in that order, and thereby, the top and bottom and the right and left of the image are inverted. And then, the object is observed as an erect image via the eye level eyepiece optical system 40 from a direction parallel to the optical axis of the objective optical system 10. On the other hand, the luminous flux transmitted through the first mirror 21 which is a half mirror is reflected by the Dach type reflection surfaces of the Dach prism 30, and thereby, the top and bottom and the right and left of the image are inverted. And then, the object is observed as an erect image via the waist level eyepiece optical system 50 from a direction perpendicular to the optical axis of the objective optical system 10. As seen from the above description, in the case where the half mirror is used as a branch plane, an erect image can be observed by either of eye level or waist level eyepiece optical system without a switch-over of the mirror.

Figure 4:
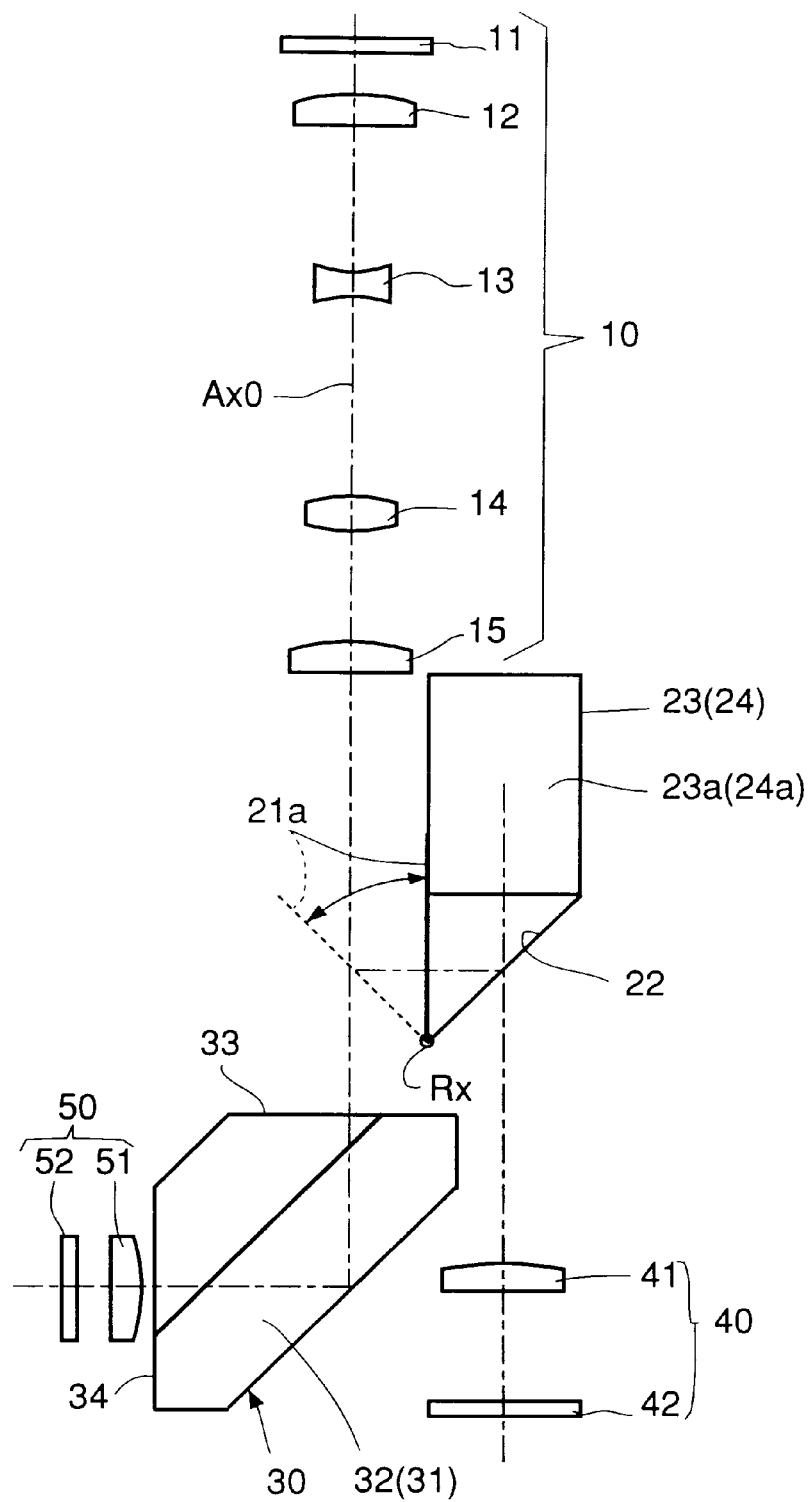
FIG. 4 is the side view similar to FIG. 3, and shows a modification of the first embodiment.

FIG. 4 is the side view similar to FIG. 3 and shows a modification of the aforesaid first embodiment. In this modification, an ordinary reflecting mirror 21a having no transmittance is used as the branch plane. This reflecting mirror 21a turns around a rotating axis Rx parallel to the mirror plane thereof, and by doing so, the reflecting mirror 21a is switchable into a first position (shown by a broken line) for guiding the luminous flux incident from the objective optical system 10 to an eye level first optical path and into a second position (shown by a solid line) for guiding the luminous flux to a waist level second optical path. In this modification, the rotating axis Rx is perpendicular to the optical axis Ax0 of the objective optical system 10. Also, other construction of this modification is the same as the first embodiment shown in FIGS. 1 to 3.

With the construction shown in FIG. 4, when the reflecting mirror 21a which functions as a branch plane is set to the first position shown by the broken line, the luminous flux incident from the objective optical system 10 is all reflected by the reflecting mirror 21a, and further, reflected by other three reflection surfaces 22, 23a and 24a of the eye level erecting optical system 20 in order, and thus, being guided to the eye level eyepiece optical system 40. On the other hand, when the reflecting mirror 21a is set to the second position, shown by the solid line, the reflecting mirror 21 is retracted from the optical path of the objective optical system 10, and then, the luminous flux from the objective optical system 10 is incident upon the Dach prism 30, and is reflected by the Dach type reflection surfaces 31 and 32 so as to be guided to the waist level eyepiece optical system 50. Since the branch mirror 21 is constructed so as to be switchable, it is possible to concentrate (converge) all light quantum upon the selected eyepiece optical systems.

Figure 5:
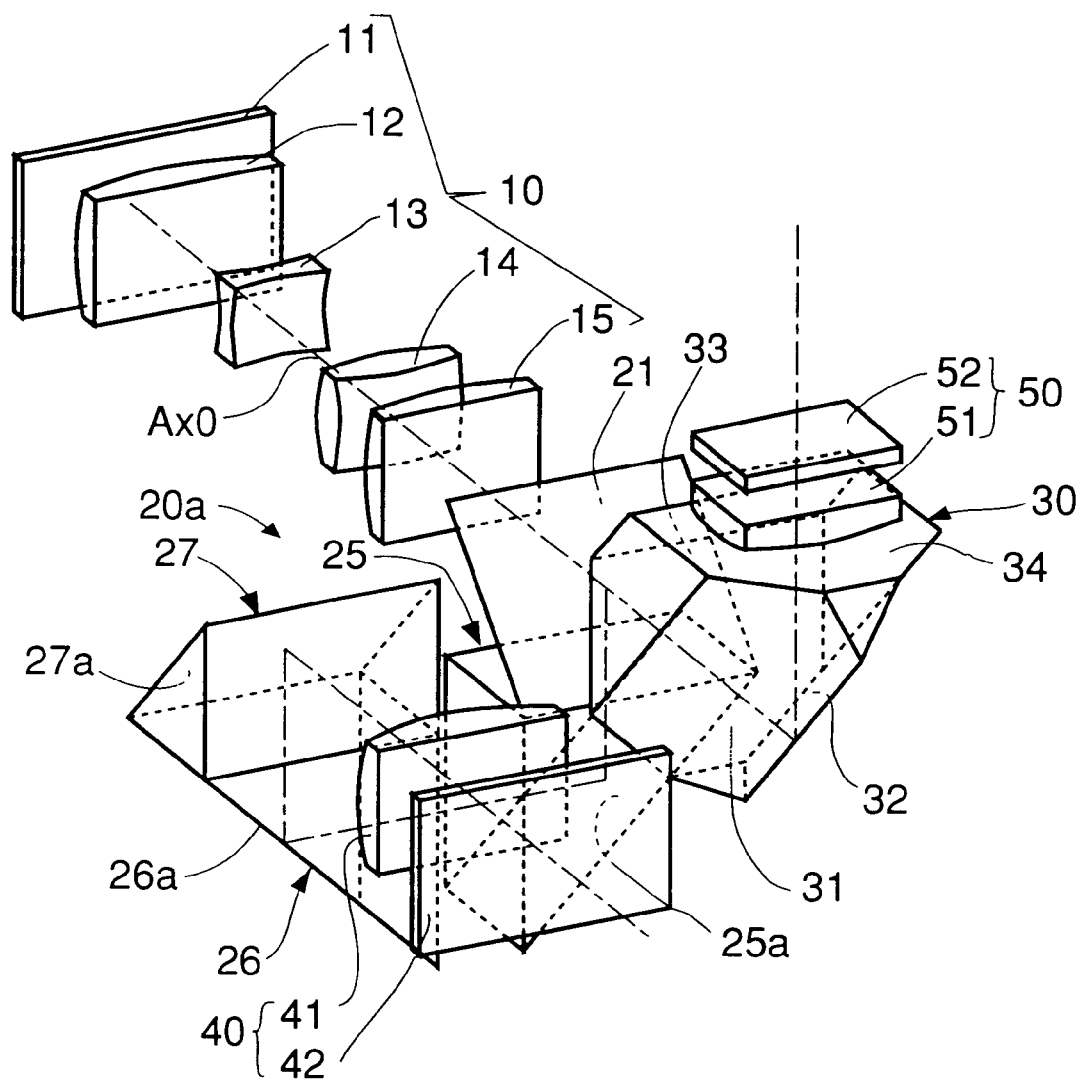
FIG. 5 is a perspective view showing an arrangement of an optical system of a real image finder according to a second embodiment of the present invention.
Figure 6:
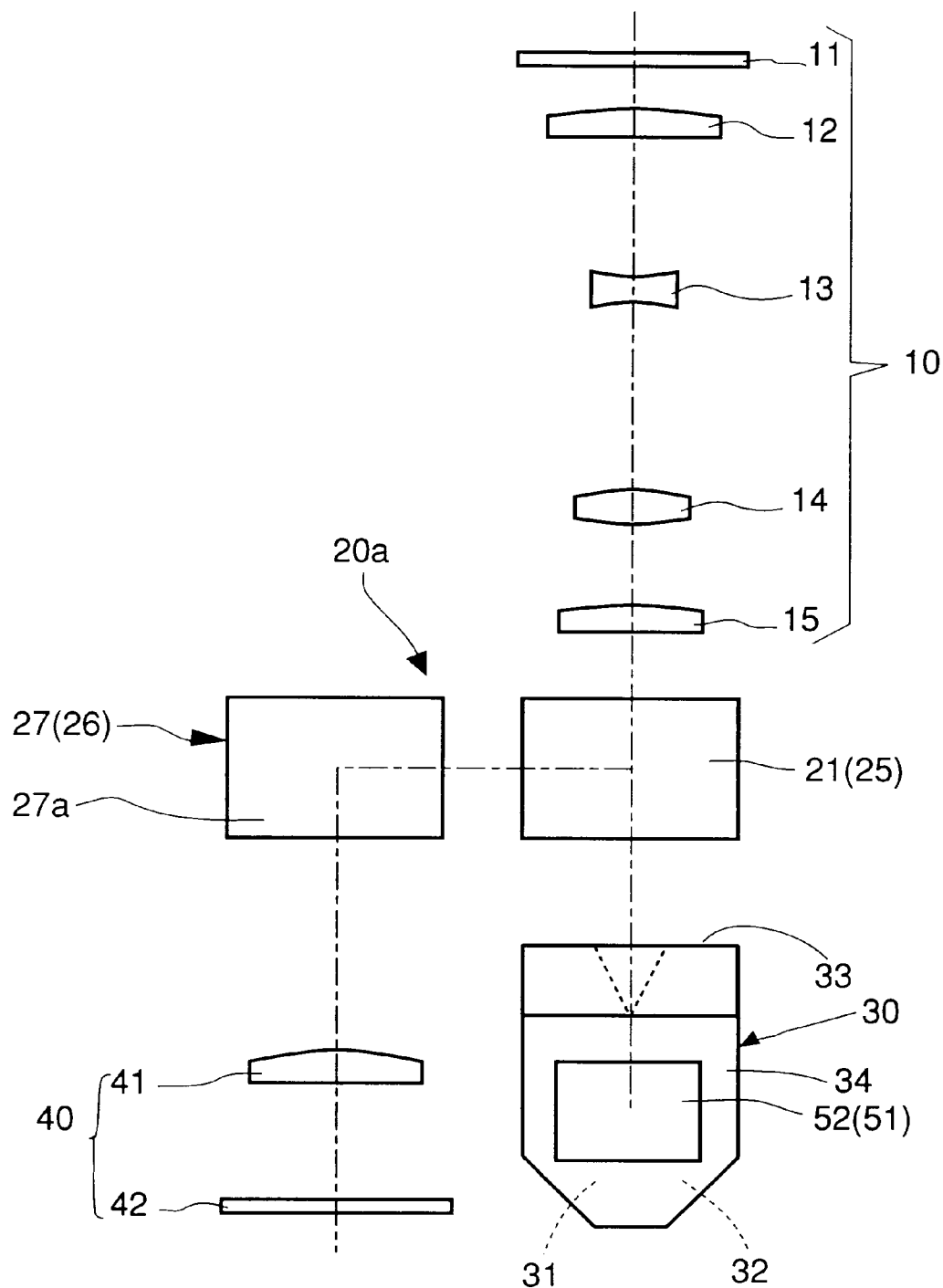
FIG. 6 is a top plan view of the optical system shown in FIG. 5.
Figure 7:
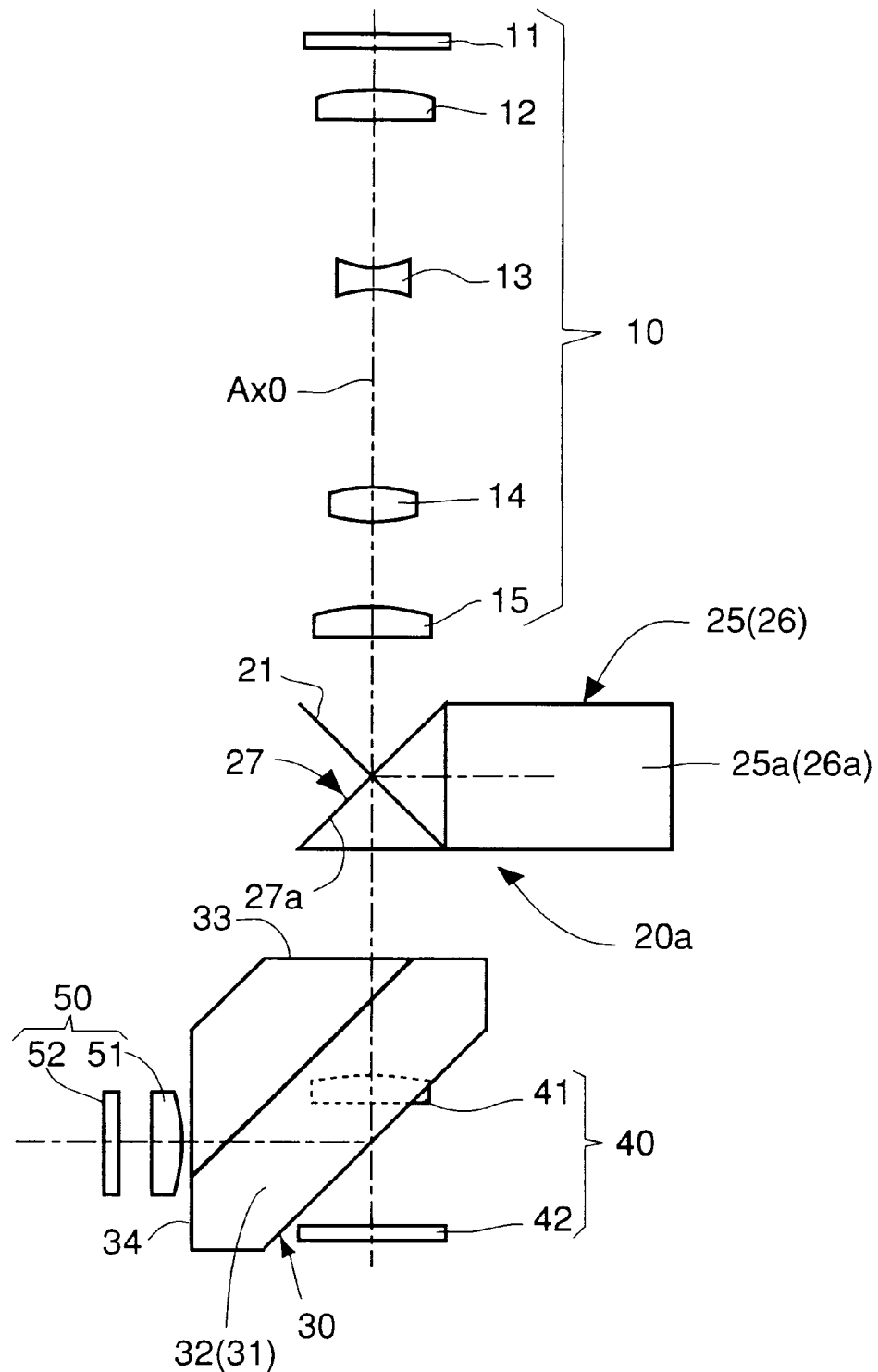
FIG. 7 is a side view of the optical system shown in FIG. 5.

FIGS. 5 to 7 show an arrangement of an optical system of a real image finder according to a second embodiment. FIG. 5 is a perspective view showing an optical system, FIG. 6 is a top plan view of the optical system shown in FIG. 5, and FIG. 7 is a right side view of the optical system shown in FIG. 5. This real image finder comprises an objective optical system 10, an eye level erecting optical system 20a which is a first erecting optical system, an eye level eyepiece optical system 40, a waist level erecting optical system 30 which is a second erecting optical system, and a waist level eyepiece optical system 50 which is a second eyepiece optical system.

Further, in this second embodiment, the construction other than the eye level erecting optical system 20a is the same as the aforesaid first embodiment.

The eye level erecting optical system 20a of the second embodiment is composed of a first mirror 21, first, second and third right-angle prisms 25, 26 and 27, and has four reflection surfaces equivalent to a Porro prism of type two. In this second embodiment, the first mirror 21 and a reflection surface 27a of the third right-angle prism 27 make a set of reflection surfaces which meet each other at right angles (90°), and further, reflection surfaces 25a and 26a of the first and second right-angle prisms 25 and 26 make an another set of reflection surfaces which meet each other at right angles (90°) The intersecting line of the first mirror 21 and the reflection surface 27a and the intersecting line of the reflection surfaces 25a and 26a are perpendicular to each other.

Of four reflection surfaces constituting the eye level erecting optical system 20a, the first mirror 21 which is nearest to the object side is constructed as a branch plane, like the aforesaid first embodiment. In accordance with the second embodiment, the luminous flux incident through the objective optical system 10 forms a spatial image (inverted image) of the object before the first mirror 21, and branches into two optical paths by the first mirror 21. The luminous flux reflected by the first mirror 21 is reflected by other three reflection surfaces 25a, 26a and 27a of the eye level erecting optical system 20a in that order, and thereby, the top and bottom and the right and left of the image are inverted. And then, the object is observed as an erect image via the eye level eyepiece optical system 40 from a direction parallel to the optical axis of the objective optical system 10. On the other hand, the luminous flux transmitted through the first mirror 21 which is a half mirror is reflected by the Dach type reflection surfaces of the Dach prism 30, and thereby, the top and bottom and the right and left of the image are inverted. And then, the object is observed as an erect image via the waist level eyepiece optical system 50 from a direction perpendicular to the optical axis of the objective optical system 10.

Figure 8:
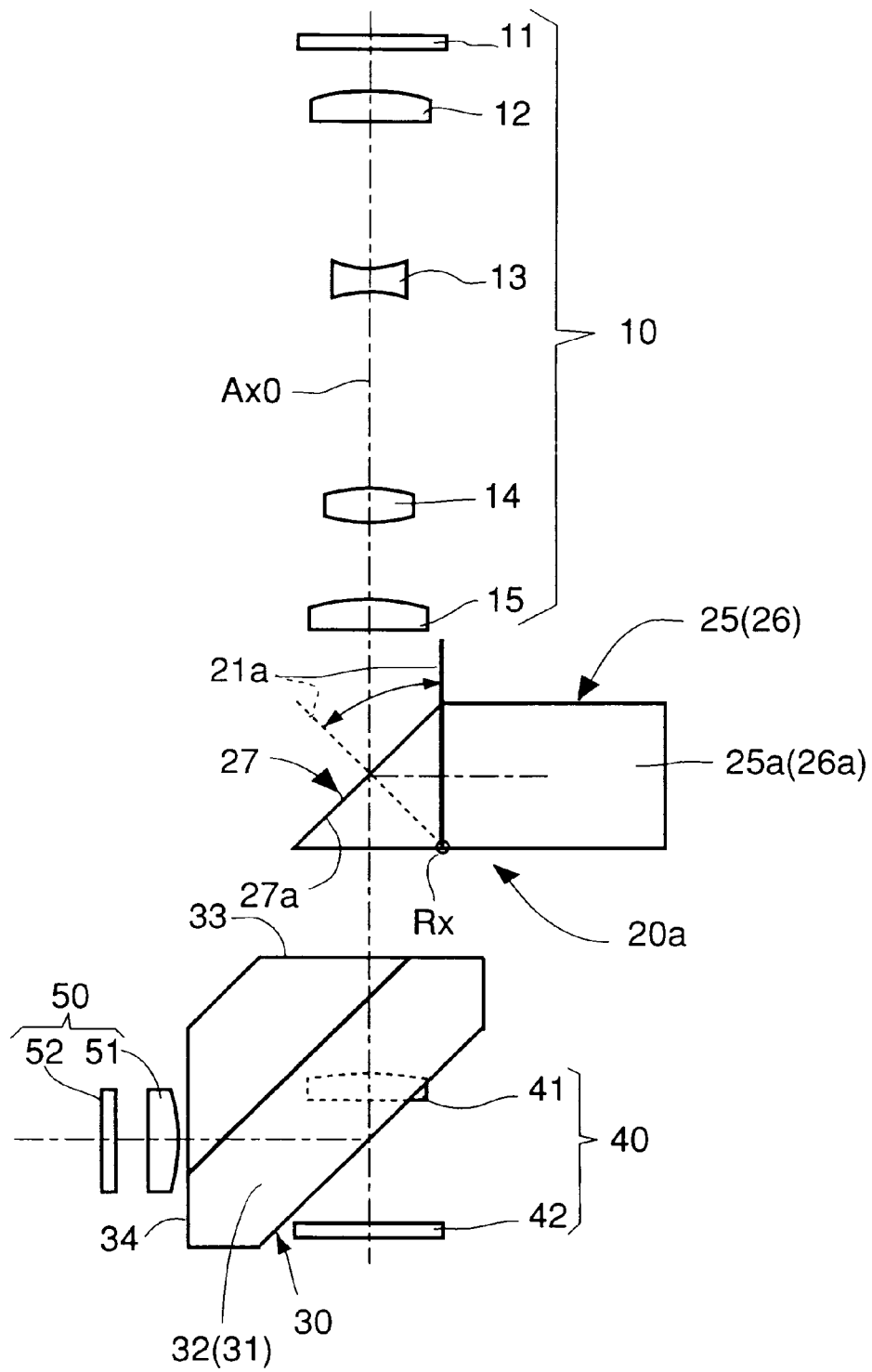
FIG. 8 is the side view similar to FIG. 7, and shows a modification of the second embodiment.

FIG. 8 is the same side view as FIG. 7, and shows a modification of the aforesaid second embodiment. In this modification example, an ordinary reflecting mirror 21a having no transmittance is used as the branch plane. This reflecting mirror 21a turns around a rotating axis Rx parallel to the mirror plane thereof, and by doing so, the reflecting mirror 21a is switchable into a position (shown by a broken line) for guiding the luminous flux incident from the objective optical system 10 to an eye level first optical path and into a position (shown by a solid line) for guiding the luminous flux to a waist level second optical path. In this modification, the rotating axis Rx is perpendicular to the optical axis Ax0 of the objective optical system 10. Also, other construction of this modification is the same as the second embodiment shown in FIGS. 5 to 7.

With the construction shown in FIG. 8, when the reflecting mirror 21a which functions as a branch plane is set to the position shown by the broken line, the luminous flux incident from the objective optical system 10 is all reflected by the reflecting mirror 21a, and further, reflected by other three reflection surfaces 25a, 26a and 27a of the eye level erecting optical system 20a in order, and thus, being guided to the eye level eyepiece optical system 40. On the other hand, when the reflecting mirror 21a is set to the position shown by the solid line, the reflecting mirror 21a retreats from the optical path of the objective optical system 10, and then, the luminous flux from the objective optical system 10 is incident upon the Dach prism 30, and is reflected by the Dach type reflection surfaces 31 and 32 so as to be guided to the waist level eyepiece optical system 50.

Figure 9:
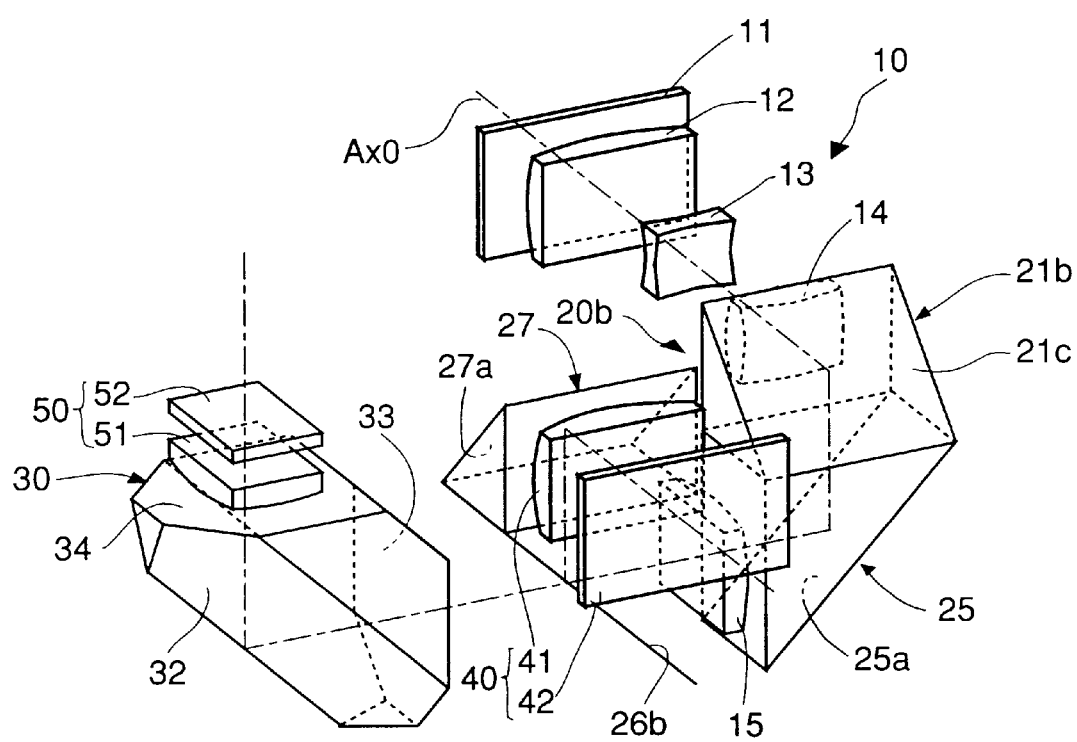
FIG. 9 is a perspective view showing an arrangement of an optical system of a real image finder according to a third embodiment of the present invention.
Figure 10:
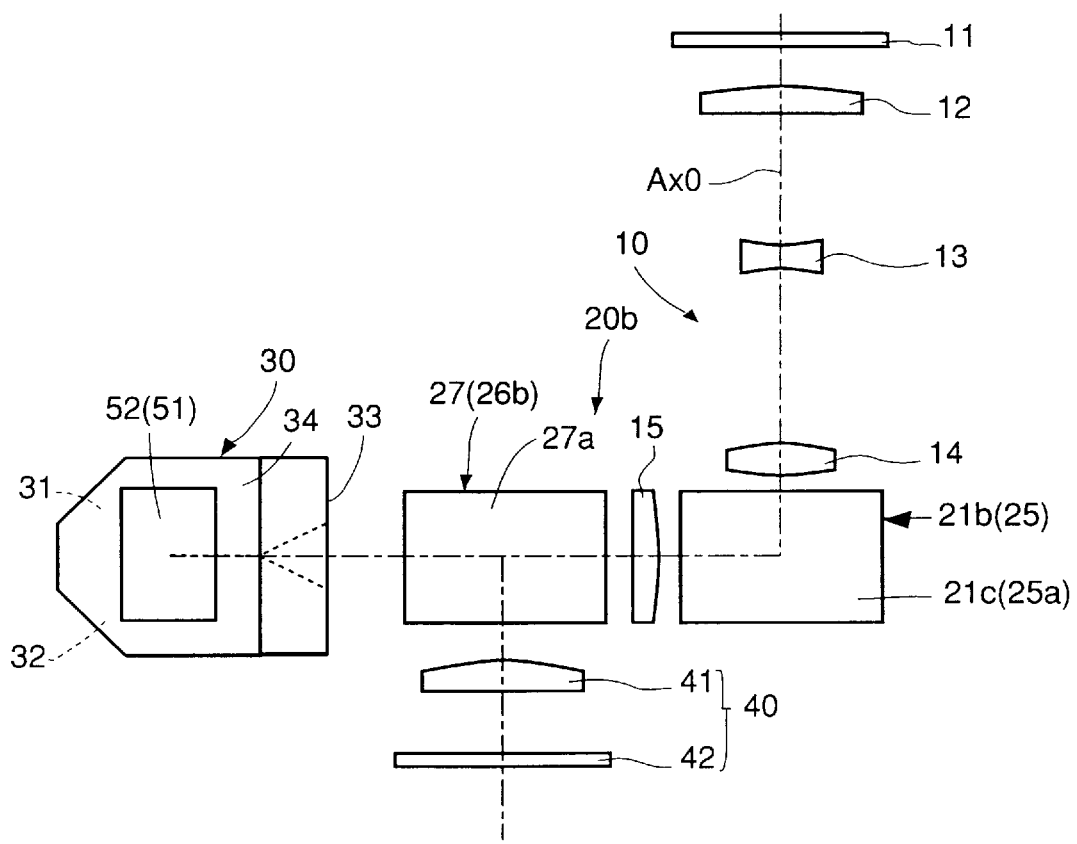
FIG. 10 is a top plan view of the optical system shown in FIG. 9.
Figure 11:
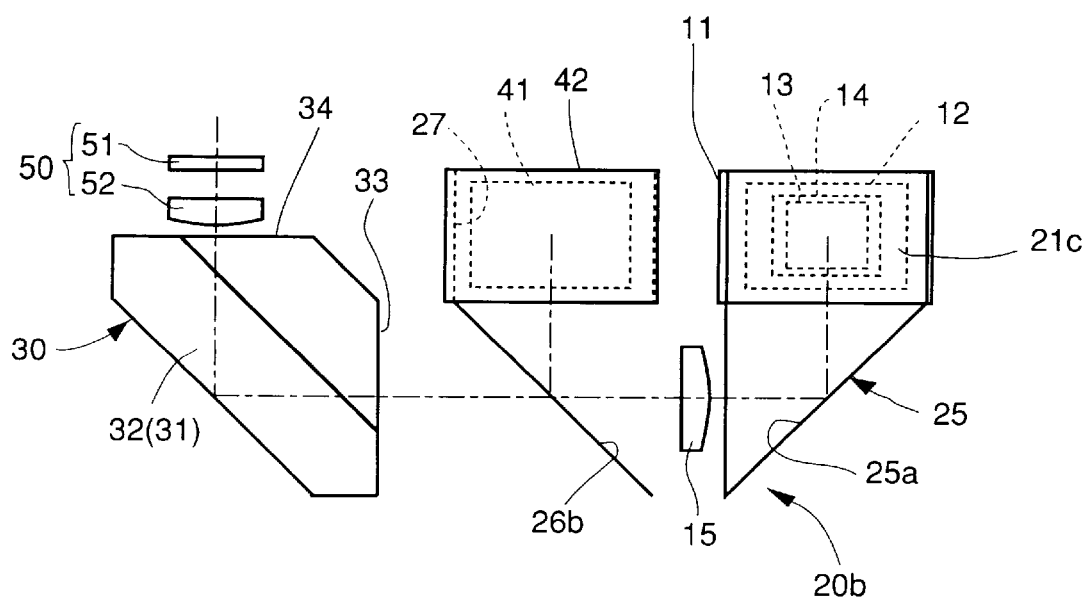
FIG. 11 is a rear view of the optical system shown in FIG. 9.

FIGS. 9 to 11 show an arrangement of an optical system of a real image finder according to a third embodiment. FIG. 9 is a perspective view showing an optical system, FIG. 10 is a top plan view of the optical system shown in FIG. 9, and FIG. 11 is a rear view of the optical system shown in FIG. 9. This real image finder comprises an objective optical system 10, an eye level erecting optical system 20b which is a first erecting optical system, an eye level eyepiece optical system 40, a waist level erecting optical system 30 which is a second erecting optical system, and a waist level eyepiece optical system 50 which is a second eyepiece optical system. Further, in this third embodiment, the construction other than the objective optical system 10 and the eye level erecting optical system 20b is the same as the aforesaid first embodiment.

The eye level erecting optical system 20b of the third embodiment is composed of first and second right-angle prisms 21b and 25, a mirror 26b and a third right-angle prisms 27, and has four reflection surfaces equivalent to the Porro prism of type two. In this third embodiment, a reflection surface 21c of the first right-angle prism 21b and a reflection surface 27a of the third right-angle prism 27 make a set of reflection surfaces which meet each other at right angles (90°), and further, a reflection surface 25a of the second right-angle prisms 25 and the mirror 26b make an another set of reflection surfaces which meet each other at right angles (90°). The intersecting line of the reflection surface 21c and the reflection surface 27a and the intersecting line of the reflection surfaces 25a and the mirror 26b are perpendicular to each other.

Moreover, the objective optical system 10 is composed of a cover glass 11 and four lenses 12, 13, 14 and 15, like the aforesaid first and second embodiments. In this case, the planoconvex lens 15 which is nearest to an image side is arranged in the eye level erecting optical system 20b, that is, between the second right-angle prism 25 and the mirror 26b.

In this third embodiment, of four reflection surfaces constituting the eye level erecting optical system 20b, the mirror 26b which is the third reflection surface from the object side is constructed as a branch plane. The mirror 26b which functions as the branch plane is a half mirror which reflects part of a luminous flux incident from the objective optical system 10 and transmits part of the same.

In accordance with the aforesaid third embodiment, the luminous flux incident through lenses 12, 13 and 14 of the objective optical system 10 is reflected by the first and second right-angle prisms 21b and 25, and then, is incident upon the planoconvex lens 15, and thus, forms a spatial image (inverted image) of the object behind the planoconvex lens. Subsequently, the luminous flux reflected by the mirror 26b is reflected by the remaining reflection surface 27a of the eye level erecting optical system 20b. And then, the object is observed as an erect image via the eye level eyepiece optical system 40 from a direction parallel to the optical axis of the objective optical system 10. On the other hand, the luminous flux transmitted through the mirror 26b which is a half mirror is reflected by the Dach type reflection surfaces of the Dach prism 30, and thereby, the top and bottom and the right and left of the image are inverted. And then, the object is observed as an erect image via the waist level eyepiece optical system 50 from a direction perpendicular to the optical axis of the objective optical system 10.

Figure 12:
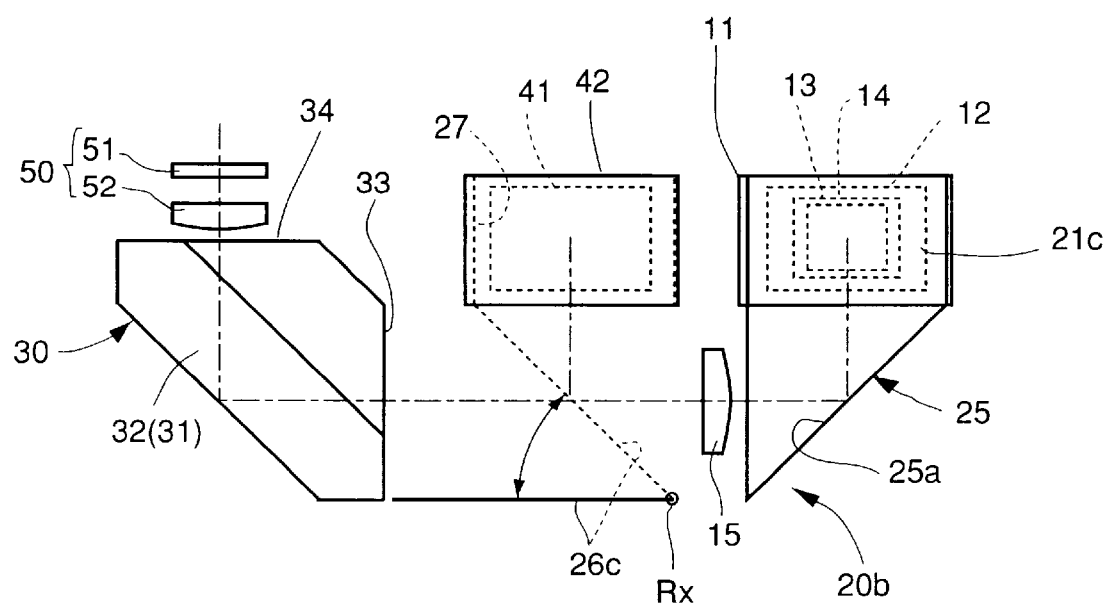
FIG. 12 is the rear view similar to FIG. 11, and shows a modification of the third embodiment.

FIG. 12 is the same side view as FIG. 11, and shows a modification of the aforesaid third embodiment. In this modification, an ordinary reflecting mirror 26c having no transmittance is used as the branch plane. This reflecting mirror 26c rotates about a rotating axis Rx which is parallel to the mirror surface thereof, and accordingly, the reflecting mirror 26c is switchable between a first position (shown by a broken line) for guiding the luminous flux incident from the objective optical system 10 to an eye level first optical path and into a second position (shown by a solid line) for guiding the luminous flux to a waist level second optical path. In this modification, the rotating axis Rx is perpendicular to an optical axis of the planoconvex lens 15. The other construction of this modification is the same as the third embodiment shown in FIGS. 9 to 11.

With the construction shown in FIG. 12, when the reflecting mirror 26c which functions as a branch plane is set to the position shown by the broken line, the luminous flux incident from the objective optical system 10 is all reflected by the reflecting mirror 26c, and further, reflected by the reflection surface 27a of the eye level erecting optical system 20b, and thus, being guided to the eye level eyepiece optical system 40. On the other hand, when the reflecting mirror 26c is set to the position shown by the solid line, the reflecting mirror 26c retreats from the optical path of the objective optical system 10, and then, the luminous flux from the objective optical system 10 is incident upon the Dach prism 30, and is reflected by the Dach type reflection surfaces 31 and 32 so as to be guided to the waist level eyepiece optical system 50.

Figure 13:
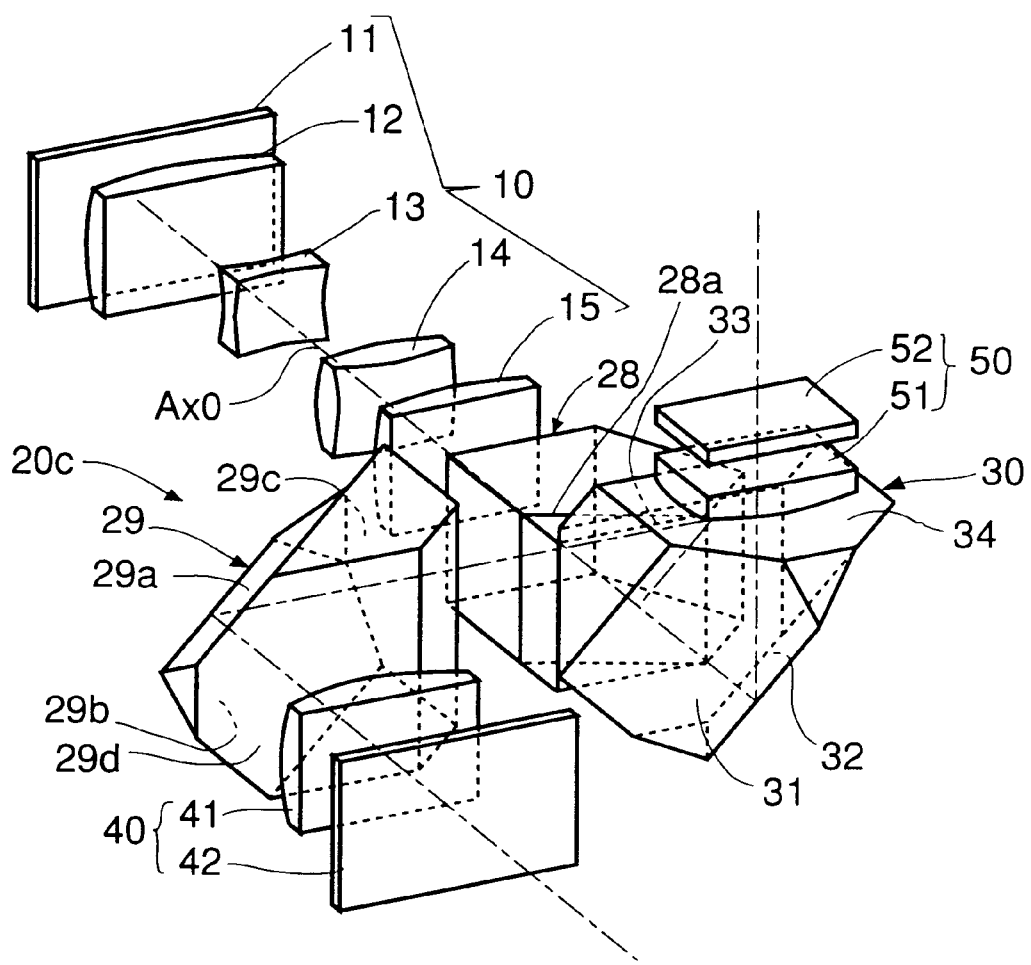
FIG. 13 is a perspective view showing an arrangement of an optical system of a real image finder according to a fourth embodiment of the present invention.
Figure 14:
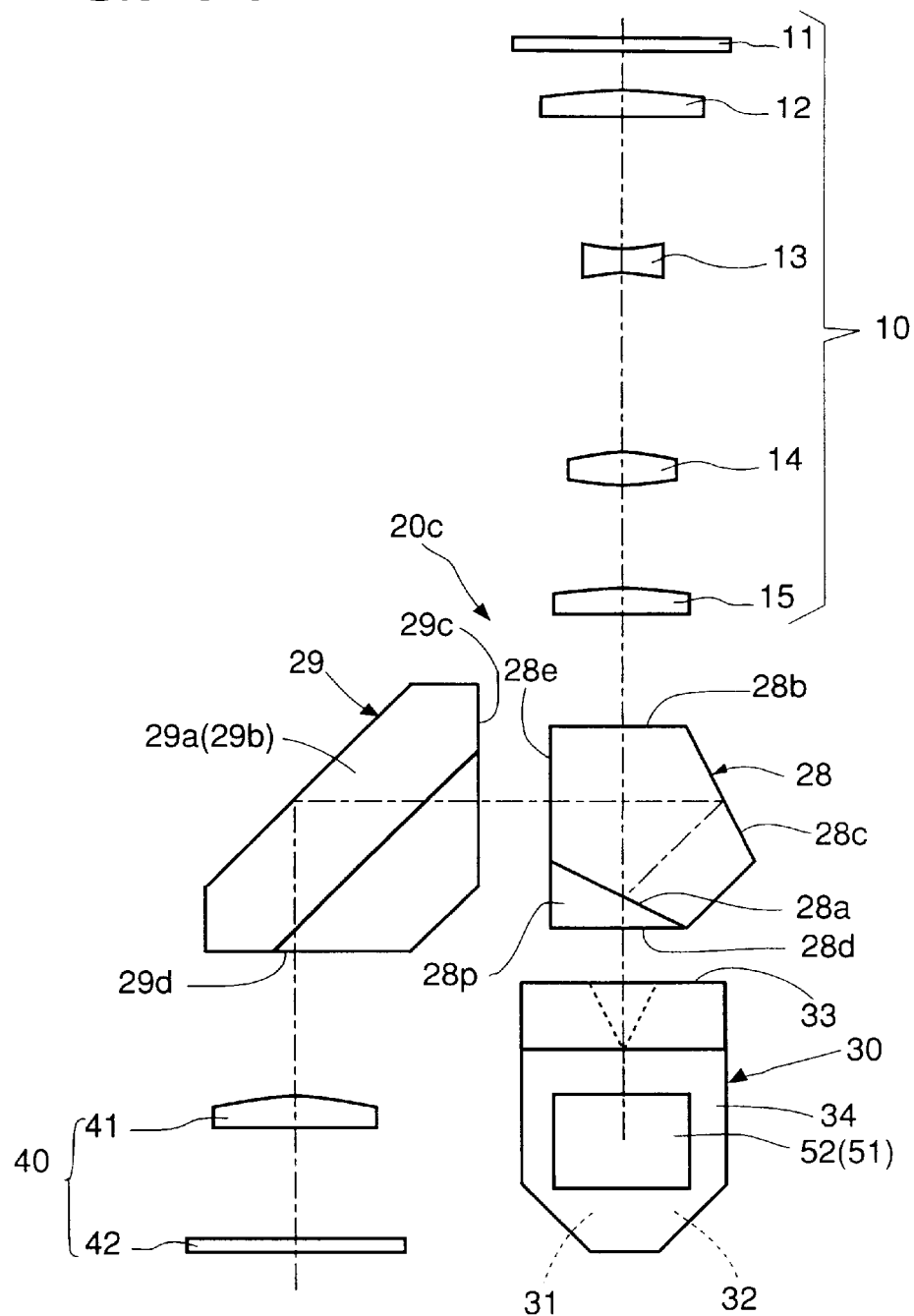
FIG. 14 is a top plan view of the optical system shown in FIG. 13.
Figure 15:
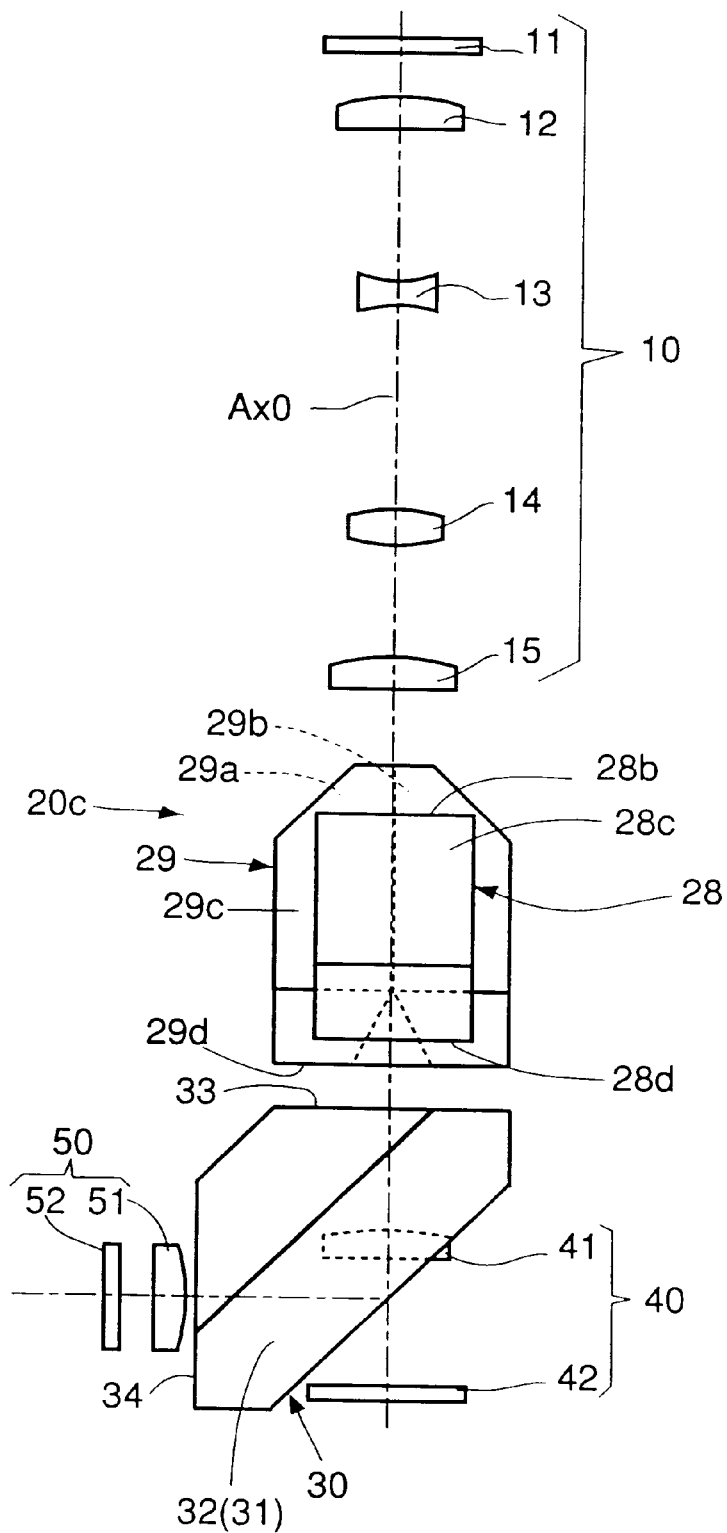
FIG. 15 is a side view of the optical system shown in FIG. 13.

FIGS. 13 to 15 show an arrangement of an optical system of a real image finder system according to a fourth embodiment. FIG. 13 is a perspective view showing an optical system, FIG. 14 is a top plan view of the optical system shown in FIG. 13, and FIG. 15 is a right side view of the optical system shown in FIG. 13. This real image finder comprises an objective optical system 10, an eye level erecting optical system 20c which is a first erecting optical system, an eye level eyepiece optical system 40, a waist level erecting optical system 30 which is a second erecting optical system, and a waist level eyepiece optical system 50 which is a second eyepiece optical system. Further, in this fourth embodiment, the construction other than the eye level erecting optical system 20c is the same as the aforesaid first embodiment.

The eye level erecting optical system 20c of the fourth embodiment is composed of a pentaprism 28 and a Dach (roof) prism 29. The pentaprism 28 has first and second reflection surfaces 28a and 28c which are arranged so that a luminous flux incident from the objective optical system 10 is deflected in its direction at right angles (90°), an incident side end surface 28b and two emitting end surfaces 28d and 28e (see FIG. 14). The first reflection surface 28a is constructed as a branch plane for branching a luminous flux along two eyepiece optical systems. The first reflection surface 28a which functions as the branch plane is constructed as a half mirror surface which reflects part of a luminous flux incident from the objective optical system 10 and transmits part of the same. Further, in order to prevent the luminous flux transmitting through the first reflection surface 28a from being deflected, a wedge-shaped small prism 28p is stuck onto the pentaprism 28 such that the incident side end surface 28b of the pentaprism 28 and one emitting side end surface 28d of the wedge-shaped small prism 28p are parallel to each other. The surface 28d serves as a light emitting surface, from which light directed to the Dach prism 30 is emitted. The Dach prism 29 is the same optical element as the Dach prism 30 of the waist level erecting optical system, and has Dach type reflection surfaces 29a and 29b, an incident side end surface 29c and an emitting side end surface 29d.

In accordance with the aforesaid fourth embodiment, the luminous flux incident through the objective optical system 10 forms a spatial image (inverted image) of the object before the pentaprism 28, and then, branches into two optical paths by the first reflection surface 28a of the pentaprism 28. Subsequently, the luminous flux reflected by the first reflection surface 28a is again reflected by the second reflection surface 28c, and then, is emitted from the emitting side end surface 28e, and thus, is incident upon the Dach prism 29 of the eye level erecting optical system 20c from the emitting side end surface 28e. And then, the luminous flux is reflected so that the top and bottom and the right and left of the image is inverted by the Dach type reflection surfaces 29a and 29b of the Dach prism 29, and is emitted from the emitting side end surface 29d, and thus, is incident upon the eye level eyepiece optical system 40. The object is observed as an erect image via the eye level eyepiece optical system 40 from a direction parallel to the optical axis of the objective optical system 10.

On the other hand, the luminous flux transmitted through the first reflection surface 28a of the pentaprism 28 which is a half-silvered plane is reflected by the Dach type reflection surfaces of the Dach prism 30, and thereby, the top and bottom and the right and left of the image are inverted. And then, the object is observed as an erect image via the waist level eyepiece optical system 50 from a direction perpendicular to the optical axis of the objective optical system 10.

As seen from the aforesaid embodiments, in the case where the half mirror surface is used as the branch plane, the erected object image is always observable by either one of two eyepiece optical systems without switching optical paths. If the reflection surface is used as the branch plane, the reflection surface is changed over in its position, and by doing so, it is possible to observe a clearer object image by either of two eyepiece optical systems as compared with the case where of the half-silvered plane is used as the branch plane. Also, in the aforesaid embodiments, the prisms used for constituting the erecting optical system is used as a reflecting member. Therefore, part or all of the prisms may be replaced with a mirror.

As is evident from the above description, according to the present invention, a real image finder which is provided with two erecting optical systems and two eyepiece optical systems with respect to a common objective optical system, and uses one plane of a plurality of reflection surfaces of one erecting optical system as a branch plane so that a luminous flux incident from the objective optical system is guided to at least any one of two eyepiece optical systems via the branch plane. Therefore, an erect image can be observed by any of eyepiece optical systems. Further, the reflection surface of one erecting optical system is used as the branch plane, and by doing so, an arrangement space of the erecting optical systems can be made smaller as compared with the case where respective erecting optical systems are arranged after an optical path branches.

What is claimed is:

1. A real image finder, comprising:

a single objective optical system, which forms a real image of an object;

a first erecting optical system which erects an object image formed by said objective optical system;

a first eyepiece optical system, an image erected by said first erecting optical system being observed through said first eyepiece optical system;

a branch plane which directs a luminous flux from said objective optical system to proceed along either a first optical path, which directs said luminous flux to said first eyepiece optical system, or a second optical path which is different from said first optical path, said branch plane being one of a plurality of reflection surfaces included in said first erecting optical system;

a second erecting optical system which is arranged on said second optical path for erecting an object image formed by said objective optical system; and a second eyepiece optical system, which is used for observing an image erected by said second erecting optical system;

wherein said first erecting optical system includes a pentaprism and a Dach prism, and wherein said second erecting optical system includes a Dach type reflection surface.

2. The real image finder according to claim 1, wherein said first eyepiece optical system comprises an eye level eyepiece optical system, and said second eyepiece optical system comprises a waist level eyepiece optical system.

3. The real image finder according to claim 1, wherein said first eyepiece optical system is arranged such that an observation is made from a direction parallel to an optical axis of said objective optical system, and wherein said second eyepiece optical system is arranged such that an observation is made from a direction perpendicular to an optical axis of said objective optical system.

4. The real image finder according to claim 1, wherein said branch plane comprises a half mirror which reflects part of an incident luminous flux and transmits part of the same, said half mirror allowing a luminous flux incident from said objective optical system incident upon said first and second eyepiece optical systems.

5. The real image finder according to claim 1, wherein a first reflection surface of said pentaprism, which is nearest to an object side, is constructed as said branch plane.

* * * * *